(12) United States Patent  
Arase et al.

(10) Patent No.: US 6,694,386 B1  
(45) Date of Patent: Feb. 17, 2004

(54) DATA TRANSFER APPARATUS THAT PERFORMS RETRANSMISSION CONTROL AND TRANSFERS DATA IN REAL TIME

(75) Inventors: Yoshitaka Arase, Otake (JP); Masaaki Morioka, Higashihiroshima (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 696 days.

(21) Appl. No.: 09/652,776

(22) Filed: Aug. 31, 2000

(30) Foreign Application Priority Data

Sep. 3, 1999 (JP) .......................... 11-250864  
Aug. 25, 2000 (JP) ....................... 2000-256106

(51) Int. Cl.[7] ............................................ G06F 13/00
(52) U.S. Cl. ............................ 710/21; 710/7; 710/20; 710/22; 710/33; 710/36; 709/231
(58) Field of Search ................. 710/7, 20, 21, 710/22, 33, 36; 709/231

(56) References Cited

U.S. PATENT DOCUMENTS 5,121,479 A * 6/1992 O'Brien ....................... 710/34
5,513,368 A * 4/1996 Garcia et al. .................. 710/22
5,991,811 A * 11/1999 Ueno et al. ................... 709/231

* cited by examiner

Primary Examiner—Jeffrey Gaffin  
Assistant Examiner—Mohammad O. Farooq

(57) ABSTRACT

A data transfer apparatus includes a reception unit for receiving data from the first external device; a storage unit for storing the data received by the reception unit; an output unit for receiving data and outputting the data to a second external device; a retransmission request receiving unit for receiving a retransmission request signal from the second external device; and a transfer control unit for having a first transfer performed when the receiving unit has received data from the first external device, the first transfer transferring the data using direct memory access (DMA) directly to both the output unit and the storage unit in parallel, and having a second transfer performed when retransmission request receiving unit has received the retransmission request signal, the second transfer transferring data, which has already been stored in the storage unit by the first transfer, to the output unit.

20 Claims, 12 Drawing Sheets

FIG. 5

| INPUT | | | OPERATION | OUTPUT | | | | |
|---|---|---|---|---|---|---|---|---|
| ADDRESS SIGNAL | | WRITE SIGNAL | READ SIGNAL | | CHIP SELECT SIGNAL | | | WRITE SIGNAL FOR FIFO MEMORY | READ SIGNAL FOR FIFO MEMORY |
| A1 | A0 | W | R | | CS_I | CS_F | CS_O | W_F | R_F |
| 0 | 0 | - | ACTIVE | READ FROM ISDN CONTROL UNIT | ACTIVE | - | - | - | - |
| 0 | 1 | - | ACTIVE | READ FROM FIFO MEMORY | - | ACTIVE | - | - | ACTIVE |
| 1 | 0 | ACTIVE | - | READ FROM FIFO MEMORY + WRITE INTO INFRARED SIGNAL COMMUNICATION UNIT | - | ACTIVE | ACTIVE | - | ACTIVE |
| 1 | 1 | ACTIVE | - | WRITE INTO FIFO MEMORY + WRITE INTO INFRARED SIGNAL COMMUNICATION UNIT | - | ACTIVE | ACTIVE | ACTIVE | - |

DATA TRANSFER APPARATUS THAT PERFORMS RETRANSMISSION CONTROL AND TRANSFERS DATA IN REAL TIME

This application is based on an application No. 11-250864 filed in Japan, the content of which is hereby incorporated by reference.

BACKGROUND OF THE INVENTION (1) Field of the Invention

The present invention relates to a data transfer apparatus that relays a signal that needs to be transferred in real-time. In particular, the present invention relates to a technique for controlling the retransmission of data on a transfer path after the data has been relayed.

(2) Description of the Prior Art

Data transfer apparatuses have been developed for relaying ISDN (Integrated Services Digital Network) data which needs to be transferred in real time. Such apparatuses receive the ISDN data once and convert the data to an infrared signal which is transmitted to a peripheral device. When necessary, the retransmission control is performed data to convert the data to an infrared signal for retransmission.

The infrared signals transmitted by such a data transfer apparatus are received by another data transfer apparatus whose construction is a mirror image of the first apparatus. This second data transfer apparatus converts the infrared signal back to ISDN data. In this way, two data transfer apparatuses can be used to form a wireless ISDN data transfer link.

FIG. 1 is a block diagram showing the overall construction of a conventional data transfer apparatus that transfers data in accordance with retransmission control.

As shown in FIG. 1, the conventional data transfer apparatus includes an input unit 51, an ISDN control unit 52, a calculation unit (hereafter CPU) 53, an address decoding unit 54, a memory 55, and an infrared signal communication unit 56. The input unit 51 receives an input of ISDN data. The ISDN control unit 52 analyzes and demultiplexes the received ISDN data and converts it into data that can be read by the CPU 53. The CPU 53 outputs an address signal that specifies one of the ISDN control unit 52, the memory 55, and the infrared signal communication unit 56, together with a read signal or a write signal that is a control signal for performing a data read or a data write. The address decoding unit 54 decodes the address signals outputted by the CPU 53 and generates chip select signals for specifying the units in the data transfer apparatus. The memory 55 is used for data reads and data writes by the CPU 53. The infrared signal communication unit 56 converts the data in the memory 55 into an infrared signal that it outputs.

Note that the ISDN control unit 52, the memory 55, and the infrared signal communication unit 56 are each composed of separate chips.

The infrared signal communication unit 56 includes an output unit 57 for outputting infrared signals to a peripheral device and an input unit 58 for receiving a retransmission request signal that the peripheral device sends as infrared data.

The following describes the operation of each component in the data transfer apparatus described above. This explanation first describes the standard operation and then the operation when data is retransmitted in response to the CPU 53 having received a predetermined retransmission request signal sent by as peripheral device.

FIG. 2 shows the sequence of data inputs and outputs within this conventional data transfer apparatus.

Note that the sequence shown in this drawing also shows the operations performed by the infrared interface of the peripheral device that receives infrared data from the present data transfer apparatus.

During normal operation, the input unit 51 receives an input of ISDN data, which is sent to the ISDN control unit 52 (steps S11, S21). The ISDN control unit 52 analyzes the ISDN data and demultiplexes it to obtain data that can be read by the CPU 53. This data is temporarily stored in the registers provided inside the CPU 53 (steps S12, S22)

In more detail, when data is to be sent from the ISDN control unit 52 to the CPU 53, the CPU 53 outputs an address signal, which shows the address assigned to the ISDN control unit 52, to the address bus and a read signal R to the read signal line.

The address decoding unit 54 decodes the address signal and outputs a chip select signal CS_I specifying the ISDN control unit 52.

The ISDN control unit chip select signal CS_I specifies the ISDN control unit 52. The read signal R has data read out from the ISDN control unit 52 and transferred to the CPU 53, where it is temporarily stored in the internal registers.

Next, the data that is temporarily stored in the registers of the CPU 53 is sent to the infrared signal communication unit 56 (steps S14, S24). The infrared signal communication unit 56 generates infrared data from the received data and has the output unit 57 output an infrared signal in accordance with this infrared data (steps S15, S25).

A retransmission request signal outputted by the peripheral device us received by the input unit 58 (step S16).

The infrared signal communication unit 56 outputs the received retransmission request signal to the CPU 53 (step S17).

The data stored in the registers in the CPU 53 is stored in the memory 55 in case a retransmission request is received (step S13). When the CPU 53 receives a retransmission request signal, the data stored in the memory 55 is sent via the CPU 53 (step S18) to the infrared signal communication unit 56 (step S19). The infrared signal communication unit 56 generates infrared data from the received data and has the output unit 57 output an infrared signal in accordance with the infrared data (step S20).

In more detail, when data is sent from the CPU 53 to the memory 55, the CPU 53 first outputs a write signal W and an address signal showing an address that is assigned to the memory 55.

The address decoding unit 54 decodes the address signal and outputs a chip select signal CS_F that specifies the memory 55.

This memory chip select signal CS_F specifies the memory 55, so that the data that is stored in the registers in the CPU 53 is stored in the memory 55.

When data is sent from the memory 55 to the infrared signal communication unit 56 via the CPU 53, the CPU 53 outputs a read signal R and an address signal that shows an address assigned to the memory 55.

The address decoding unit 54 decodes this address signal and outputs a chip select signal CS_F that specifies the memory 55.

This memory chip select signal CS_F selects the memory 55, so that data in the memory is read out by the CPU 53 and stored in the internal registers in the CPU 53.

After this, the CPU 53 outputs a write signal W and an address signal that specifies an address assigned to the infrared signal communication unit 56.

The address decoding unit 54 decodes this address signal and outputs a chip select signal CS_O that specifies the infrared signal communication unit 56.

The infrared signal communication unit 56 is specified by this infrared signal communication unit chip select signal CS_O, so that the data stored in the registers of the CPU 53 is written into the infrared signal communication unit 56 where it is processed thereafter.

The procedure described above has data transferred by the output unit 57 using standard infrared signals. This transferred data is based on the ISDN data stored in the memory 55. By sending a retransmission request signal to the CPU 53, a peripheral device can have the data in the memory 55 (hereafter "retransmission data") transferred to the infrared signal communication unit 56 where, in addition to the standard output described above, the output unit 57 outputs an infrared signal based on the retransmission data.

The following describes the retransmission of data in more detail. The retransmission data is transmitted from the memory 55 to the infrared signal communication unit 56 in the same way as during standard data transmission. This means that the CPU 53 first outputs a read signal R and an address signal showing an address that is assigned to the memory 55.

The address decoding unit 54 decodes the address signal and outputs a chip select signal CS_F that specifies the memory 55.

This memory chip select signal CS_F specifies the memory 55, so that the retransmission data stored in the memory 55 is read out by the CPU 53 and is stored in the internal registers of the CPU 53.

Next, the CPU 53 outputs a write signal W and an address signal that shows an address assigned to the infrared signal communication unit 56.

The address decoding unit 54 decodes this address signal and outputs a chip select signal CS_O that specifies the infrared signal communication unit 56.

The infrared signal communication unit 56 is specified by this infrared signal communication unit chip select signal CS_O, so that the data stored in the registers of the CPU 53 is written into the infrared signal communication unit 56 where it is processed thereafter.

By performing the above procedure, the conventional data transfer apparatus can convert ISDN data to infrared data and transfer the infrared data while performing control so as to retransmit infrared data for ISDN data that is inputted into the data transfer apparatus.

In readiness for eventualities such as an outputted infrared signal failing to reach the peripheral device that receives signals from the output unit 57, the CPU 53 in this conventional data transfer apparatus reads out data that has been received by the ISDN control unit 52 and writes the data into the memory 55. When data is to be retransmitted, the data that has been written into the memory 55 is read out by the CPU 53 and written into the infrared signal communication unit 56.

The above method suffers from the following drawback. In some cases, real-time transfer is required for the data being transferred, such as when the data transfer apparatus is used to relay audio data for a telephone conversation. The time taken by the processing between the input of ISDN data and the output of the infrared signal or by the processing required for retransmission can appear as a time lag in the received audio, thereby impeding the telephone conversation. As a result, the time taken between the input of the ISDN data and the output of the infrared signal and the time taken by retransmission need to be minimized.

As a result, there are demands for a data transfer apparatus reduces the time taken by internal data transfers and so can properly handle data, such as audio data for a telephone conversation, that needs to be transferred in real time.

In addition to performing internal data transfers for the data transfer apparatus, the CPU 53 also has to perform judgements, such as a judgement as whether a retransmission request signal has been received. This means that the CPU 53 has a high processing load, which reduces the speed of the data transfers within the data transfer apparatus and increases the time taken between the receipt of a retransmission request signal and the completion of the data retransmission. As a result, data cannot be retransmitted soon after a retransmission request signal is received. This reduces the number of retransmission that can be performed.

SUMMARY OF THE INVENTION

In view of the stated problem, a first object of the present invention is to provide a data transfer apparatus that can transfer data at a speed that is closer to real time.

The second object of the present invention is to provide a data transfer apparatus that can quickly retransmit data that has not been received properly by the transfer destination.

The first object of the present invention can be achieved by a data transfer apparatus that receives data, which should be transferred in real time, from a first external device and outputs the data to a second external device, the second external device receiving the data outputted by the data transfer apparatus and outputting a retransmission request signal for the data to the data transfer apparatus when the data is not received properly, the data transfer apparatus including: a receiving unit for receiving data from the first external device; a storage unit for storing the data received by the receiving unit; an output unit for receiving data and outputting the data to the second external device; a retransmission request receiving unit for receiving a retransmission request signal from the second external device; and a transfer control unit for having a first transfer performed when the receiving unit has received data from the first external device and a second transfer performed when the retransmission request receiving unit has received the retransmission request signal, the first transfer transferring the data directly to both the output unit and the storage unit in parallel using direct memory access (DMA), and the second transfer transferring data, which has already been stored in the storage unit by the first transfer, to the output unit.

With the stated construction, the data is transferred by DMA directly from the receiving unit to the storage unit and the output unit in parallel. Transfer to two components is performed in a single step and is performed without the data passing the CPU. This means that the data transfer apparatus can transfer data at high speed.

The second object of the present invention can be achieved by having the second transfer transfer the data stored in the storage unit to the output unit using DMA.

With the stated construction, when a retransmission request signal is received, the data stored in the storage unit is transferred to the output unit using DMA. This means that the data is not transferred via a processing unit such as a CPU. This alleviates the processing load of the CPU and means that the data transfer apparatus can transfer data at high speed.

Here, the storage unit may be a FIFO (first-in, first-out) memory that temporarily stores data received from the receiving unit, and the second transfer may also transfer the data outputted by the FIFO memory back into the FIFO memory using DMA.

The stated construction is capable of high-speed data reads and stores the data that has been read back into the FIFO memory. This enables the data transfer apparatus to retransmit the same data two or more times when necessary.

Here, the transfer control unit may have the first transfer performed intermittently with a predetermined interval, and the second transfer performed only when the retransmission request signal is received in a reception period that starts at the end of a first transfer and ends at a time given as the start of a next first transfer minus a period taken between (1) reception of the retransmission request signal and (2) an end of the second transfer.

When retransmission can be repeatedly performed for the same data, a retransmission request signal for a set of data will only be accepted during a period where the data can be transmitted without interfering with the transmission of the next set of data. By operating in this way, a data transfer apparatus can avoid delays in data transfer that occur due to retransmission of data.

Here, the transfer control unit may have the first transfer and the second transfer transfer an amount of data that is equal to an input amount, the input amount being an amount of data received from the first external device in the predetermined interval, and the receiving unit may include a FIFO memory for temporarily storing data that is received in order from the first external device, the FIFO memory having a storage capacity that is at least equal to the input amount.

With the stated construction, the first transfer and second transfer transfer an amount of data that is equal to the amount of data inputted from the first external device in the predetermined period. Since the data is inputted and outputted in balanced amounts, underflows and overflows can be avoided in the FIFO memory.

Here, the retransmission request signal may be an infrared signal, the retransmission request receiving unit may include an infrared signal sensor including an infrared signal receiver, and the output unit may be an infrared signal emitter that converts the received data into an infrared signal and outputs the infrared signal.

The stated construction uses infrared signal communication. While the transmission of signals can be impeded by physical obstacles, the present data transfer apparatus increases the number of retransmissions that can be performed for data, even when the data needs to be transferred in almost real-time. This greatly increases the probability of the data being properly transferred.

Here, the first external device and the receiving unit maybe connected via ISDN (Integrated Services Digital Network) lines, the data received from the first external device may be multiplexed into a signal, and the receiving unit may demultiplex the data from the signal.

The above data transfer apparatus can transfer data for a videophone or the like that is inputted via an ISDN in almost real-time.

Here, the transfer control unit may have the first transfer performed intermittently with a predetermined interval, and the second transfer performed only when the retransmission request signal is received in a reception period that starts at the end of a first transfer and ends at a time given as the start of a next first transfer minus a period taken between (1) reception of the retransmission request signal and (2) an end of the second transfer.

When retransmission can be repeatedly performed for the same data, a retransmission request signal for a set of data will only be accepted during a period where the data can be transmitted without interfering with the transmission of the next set of data. By operating in this way, a data transfer apparatus can avoid delays in data transfer that occur due to retransmission of data.

Here, the transfer control unit may have the first transfer and the second transfer transfer an amount of data that is equal to an input amount, the input amount being an amount of data received from the first external device in the predetermined interval, and the receiving unit may include a FIFO memory for temporarily storing data that is received in order from the first external device, the FIFO memory having a storage capacity that is at least equal to the input amount.

With the stated construction, the first transfer and second transfer transfer an amount of data that is equal to the amount of data inputted from the first external device in the predetermined period. Since the data is inputted and outputted in balanced amounts, underflows and overflows can be avoided in the FIFO memory.

Here, the retransmission request signal may be an infrared signal, the retransmission request receiving unit may include an infrared signal sensor including an infrared signal receiver, and the output unit may be an infrared signal emitter that converts the received data into an infrared signal and outputs the infrared signal.

The stated construction uses infrared signal communication. While the transmission of signals can be impeded by physical obstacles, the present data transfer apparatus increases the number of retransmissions that can be performed for data, even when the data needs to be transferred in almost real-time. This greatly increases the probability of the data being properly transferred.

Here, the first external device and the receiving unit may be connected via ISDN (Integrated Services Digital Network) lines, the data received from the first external device may be multiplexed into a signal, and the receiving unit may demultiplex the data from the signal.

The above data transfer apparatus can transfer data for a videophone or the like that is inputted via an ISDN in almost real-time.

The first object of the present invention can also be achieved by a data transfer system including a first apparatus and a second apparatus, the first apparatus receiving data that needs to be transferred in real time from an external device and outputting the data to the second apparatus, the first apparatus including: a first receiving unit for receiving data from the external device; a storage unit for storing data received by the first receiving unit; an output unit for receiving data and outputting the data to the second apparatus; a retransmission request receiving unit for receiving the retransmission request signal from the second apparatus; and a transfer control unit for having a first transfer performed when the first receiving unit has received data from the external device and a second transfer performed when the retransmission request receiving unit has received the retransmission request signal, the first transfer transferring the data directly to both the output unit and the storage unit in parallel using DMA, and the second transfer transferring data, which has already been stored in the storage unit by the first transfer, to the output unit, the second apparatus including: a second receiving unit for receiving data outputted by the first apparatus; and a retransmission request issuing unit for judging, when the second receiving unit has received data, whether the data has been properly received and outputting a retransmission request signal to the first apparatus when the data has not been properly received.

With the stated construction, the data is transferred by DMA directly from the receiving unit to the storage unit and the output unit in parallel. Transfer to two components is performed in a single step and is performed without the data passing the CPU. This means that the data transfer system can transfer data at high speed.

The second object of the present invention can also be achieved by having the second transfer transfer data from the storage unit to the output unit using DMA.

With the stated construction, when the second receiving unit fails to receive the data from the first apparatus properly, the data stored in the storage unit is transferred to the output unit using DMA. This means that the data is not transferred via a processing unit such as a CPU. This alleviates the processing load of the CPU and means that the data transfer system can transfer data at high speed.

Here, the storage unit may be a FIFO memory that temporarily stores data received from the first receiving unit, and the second transfer may also transfer the data outputted by the FIFO memory back into the FIFO memory using DMA.

The stated construction is capable of high-speed data reads and stores the data that has been read back into the FIFO memory. This enables the data transfer apparatus to retransmit the same data two or more times when necessary.

Here, the transfer control unit may have the first transfer performed intermittently with a predetermined interval, and the second transfer performed only when the retransmission request signal is received in a reception period that starts at the end of a first transfer and ends at a time given as the start of a next first transfer minus a period taken between (1) reception of the retransmission request signal and (2) an end of the second transfer.

When retransmission can be repeatedly performed for the same data, a retransmission request signal for a set of data will only be accepted during a period where the data can be transmitted without interfering with the transmission of the next set of data. By operating in this way, a data transfer system can avoid delays in data transfer that occur due to retransmission of data.

Here, the transfer control unit may have the first transfer and the second transfer transfer an amount of data that is equal to an input amount, the input amount being an amount of data received from the first external device in the predetermined interval, and the first receiving unit may include a FIFO memory for temporarily storing data that is received in order from the external device, the FIFO memory having a storage capacity that is at least equal to the input amount.

With the stated construction, the first transfer and second transfer transfer an amount of data that is equal to the unit by which data is inputted from the first external device. Since the data is inputted and outputted in balanced amounts, underflows and overflows can be avoided in the FIFO memory.

Here, the retransmission request signal may be an infrared signal, the retransmission request receiving unit may include an infrared signal sensor including an infrared signal receiver, and the output unit may be an infrared signal emitter that converts the received data into an infrared signal and outputs the infrared signal.

The stated construction uses infrared signal communication. While the transmission of signals can be impeded by physical obstacles, the present data transfer system increases the number of retransmissions that can be performed for data, even when the data needs to be transferred in almost real-time. This greatly increases the probability of the data being properly transferred.

The first object of the present invention can also be achieved by a data transfer method that has a data transfer apparatus receive data, which should be transferred in real time, from a first external device and output the data to a second external device, the second external device receiving the outputted data and outputting a retransmission request signal for the data to the data transfer apparatus when the data is not received properly, the data transfer apparatus including a storage unit for storing data and an output unit for outputting data to the second external device, and the data transfer method including: a receiving step for receiving data from the first external device; a retransmission request receiving step for receiving the retransmission request signal from the second external device; and a transfer control step for having a first transfer performed when the receiving step has received data from the first external device and a second transfer performed when the retransmission request receiving step has received the retransmission request signal, the first transfer transferring the data directly to both the output unit and the storage unit in parallel using DMA, and the second transfer transferring data, which has already been stored in the storage unit by the first transfer, to the output unit; and an output step for having the output unit output the transferred data to the second external device.

With the stated method, the data received in the receiving step is transferred by DMA directly to the storage unit and the output unit in parallel. Transfer to two components is performed in a single step and is performed without the data passing the CPU. This means that the data transfer method can transfer data at high speed.

The second object of the present invention can also be achieved by having the second transfer transfer the data stored in the storage unit to the output unit using DMA.

With the stated method, when a retransmission request signal has been received, the data stored in the storage unit is transferred to the output unit using DMA. This means that the data is not transferred via a processing unit such as a CPU. This alleviates the processing load of the CPU and means that the data transfer method can transfer data at high speed.

Here, the storage unit may be a FIFO memory that temporarily stores data received from the first external device, and the second transfer may also transfer the data outputted by the FIFO memory back into the FIFO memory using DMA.

The stated construction is capable of high-speed data reads and stores the data that has been read back into the FIFO memory. This enables the data transfer apparatus to retransmit the same data two or more times when necessary.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the Drawings:

FIG. 5 shows the correspondence between signals inputted into the address decoding control unit 4 and the signals outputted by the address decoding control unit 4 for the various operations of the data transfer apparatus of the present embodiment;

DESCRIPTION OF THE PREFERRED EMBODIMENT(S)

The following describes a data transfer apparatus (an infrared signal outputting apparatus) that is a first embodiment of the present invention, with reference to the attached figures.

Data Transfer Apparatus

Figure 1:
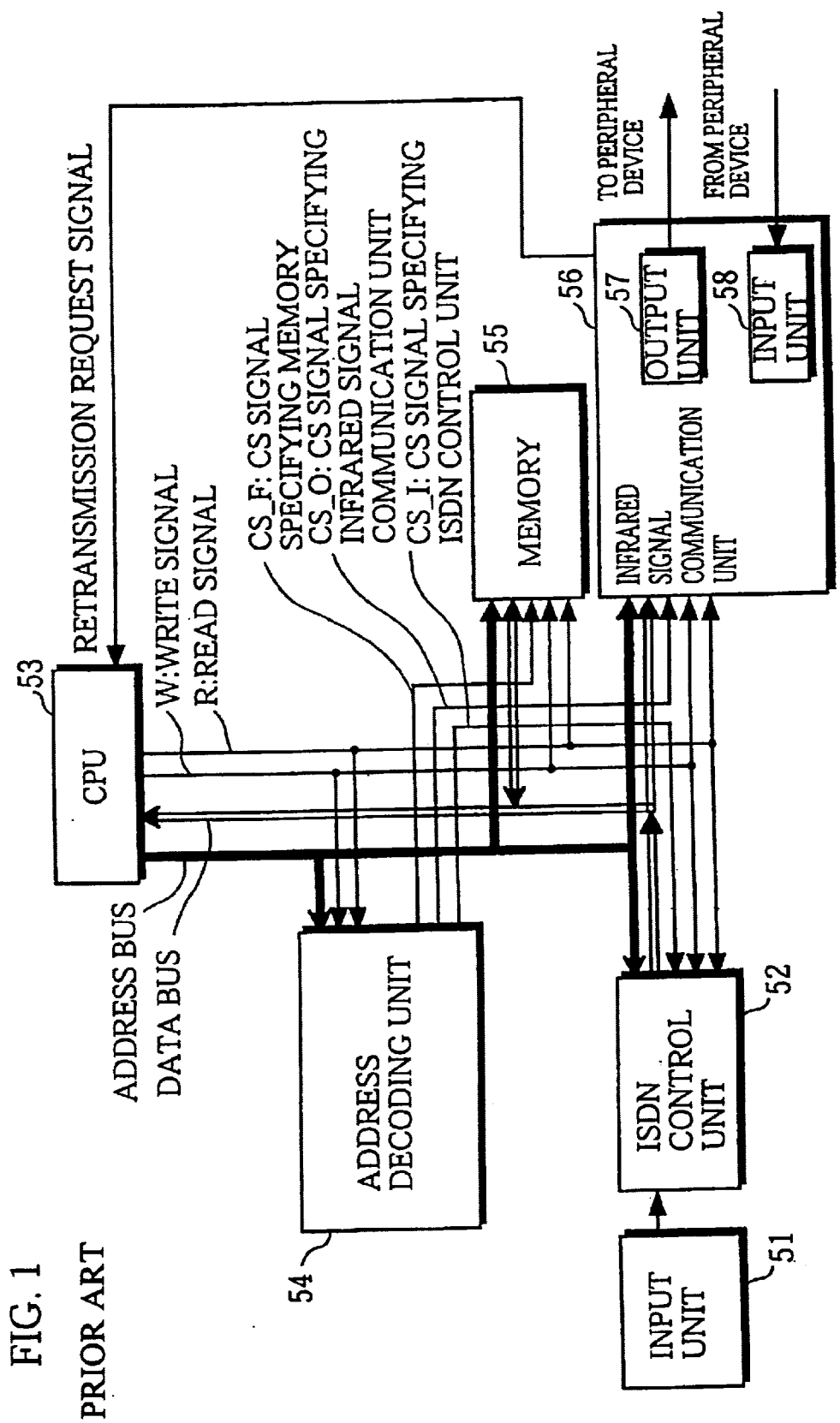
FIG. 1 is a block diagram showing the overall construction of a conventional data transfer apparatus that transfers data in accordance with retransmission control.
Figure 2:
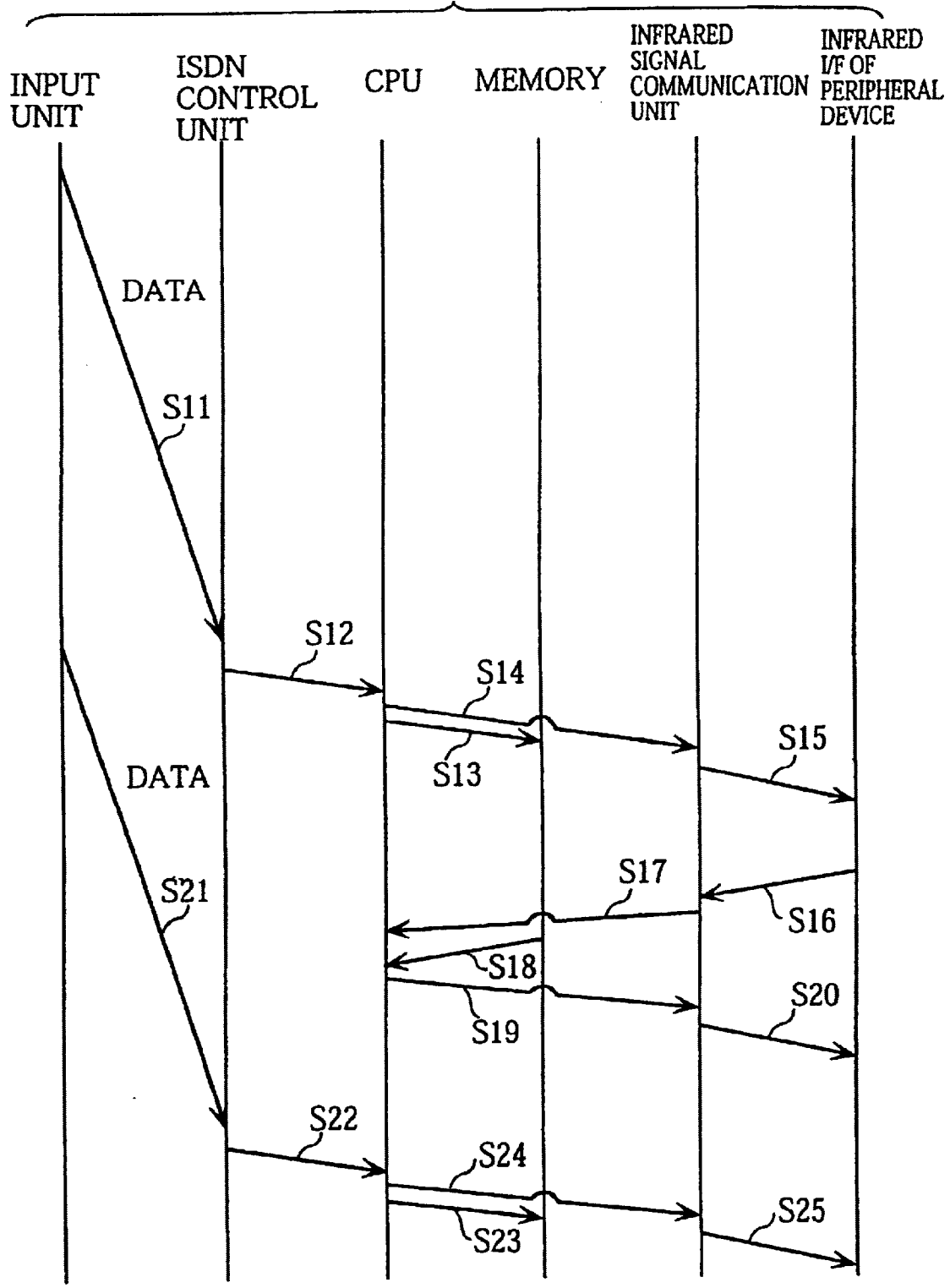
FIG. 2 shows the sequence of data inputs and outputs within this conventional data transfer apparatus.
Figure 3:
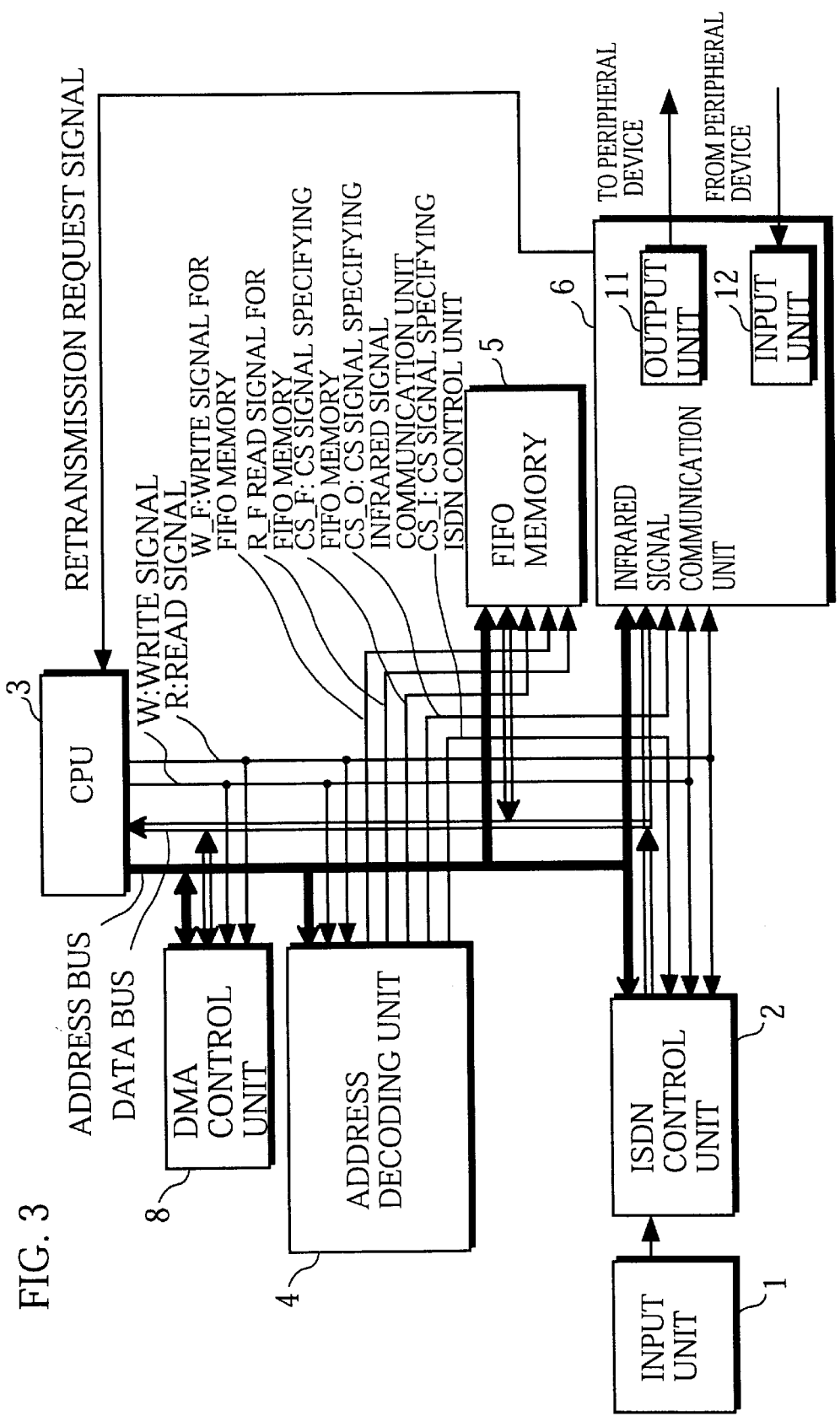
FIG. 3 is a block diagram showing the overall construction of a data transfer apparatus in this first embodiment of the present invention.
Figure 4:
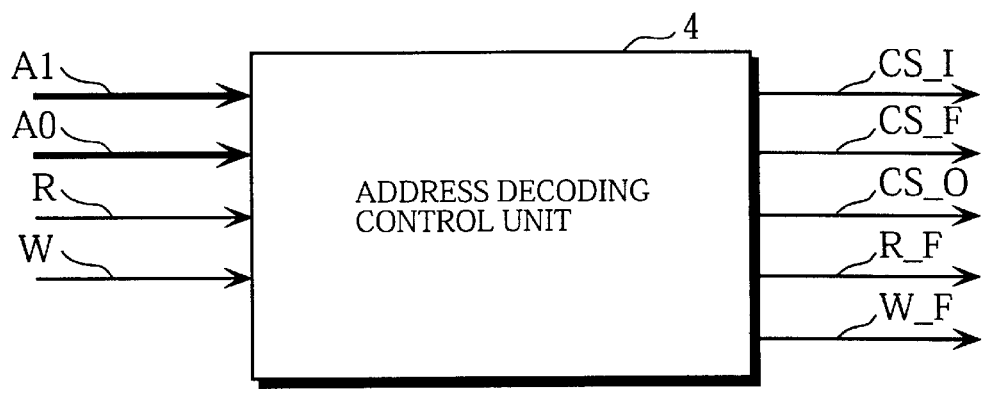
FIG. 4 shows the signals that are inputted into and outputted from the address decoding unit 4 shown in FIG. 3.

FIG. 3 is a block diagram showing the overall construction of a data transfer apparatus in this first embodiment of the present invention. FIG. 4 shows the signals that are inputted into and outputted from the address decoding unit 4 shown in FIG. 3.

As shown in FIG. 3, the present data transfer apparatus includes an input unit 1, an ISDN control unit 2, a calculation unit (hereafter CPU) 3, an address decoding control unit 4, a FIFO memory 5, a infrared signal communication unit 6, and a DMA (Direct Memory Access) control unit 8. The input unit 1 receives an input of ISDN data. The ISDN control unit 2 analyzes and demultiplexes the received ISDN data and converts it into data that can be read by the DMA control unit 8. The CPU 3 controls the DMA control unit 8. The address decoding control unit 4 decodes address signals outputted by the DMA control unit 8 and generates chip select signals for specifying other components in the data transfer apparatus. The FIFO memory 5 is used for data reads and data writes by the DMA control unit 8. The infrared signal communication unit 6 converts the data it receives from the DMA control unit 8 into infrared signals that it outputs. The DMA control unit 8 controls DMA transfers between the ISDN control unit 2, the FIFO memory 5, and the infrared signal communication unit 6.

The infrared signal communication unit 6 includes an output unit 11 for outputting an infrared signal to a peripheral device and an input unit 12 for receiving a retransmission request signal that the peripheral device sends as infrared data.

As one example, the CPU 3 may perform operations on 16-bit data, the FIFO memory 5 may store 512 bytes of data, and the transfer speed for data transfers between an external device and the input unit 1 may be 128 kbps.

On receiving a FIFO memory chip select signal CS_F, the FIFO memory 5 waits to receive a signal requesting the input or output of data, which is to say, the FIFO memory write signal W_F or the FIFO memory read signal R_F. On receiving the FIFO memory read signal R_F, the FIFO memory 5 gets ready to transfer data that has previously been stored. On receiving the FIFO memory write signal W_F, the FIFO memory 5 gets ready to store data it receives. These signals are described in detail later in this specification.

The ISDN control unit 2, the FIFO memory 5, and the infrared signal communication unit 6 in this data transfer apparatus are each composed of a separate chip. The ISDN control unit 2, the CPU 3, the address decoding control unit 4, the FIFO memory 5, the infrared signal communication unit 6, and the DMA control unit 8 are connected to one another via the address bus. The ISDN control unit 2, the CPU 3, the FIFO memory 5, the infrared signal communication unit 6, and the DMA control unit 8 are also connected to one another via the data bus. The ISDN control unit 2, the CPU 3, the address decoding control unit 4, the infrared signal communication unit 6, and the DMA control unit 8 are also connected to one another via signal lines that transfer signals, including the read signal R and the write signal W. These signal lines form part of the control bus.

The address decoding control unit 4 and FIFO memory 5 are connected to one another via signal lines that transfer the FIFO memory write signal W_F, the FIFO memory read signal R_F, and the FIFO memory chip select signal CS_F. The address decoding control unit 4 and the ISDN control unit 2 are connected via a signal line for transferring the ISDN control unit chip select signal CS_I. The address decoding control unit 4 and the infrared signal communication unit 6 are connected via a signal line for transferring the infrared signal communication unit chip select signal CS_O.

As shown in FIG. 4, the address decoding control unit 4 receives an input of the address signals A1 and A0 on the address bus and an input of the read signal R and write signal W on the control bus. The address decoding control unit 4 decodes these signals and outputs the ISDN control unit chip select signal CS_I, the FIFO memory chip select signal CS_F, the infrared signal communication unit chip select signal CS_O, the FIFO memory read signal R_F, and the FIFO memory write signal W_F as appropriate.

The following describes the signals that the address decoding control unit 4 outputs in response to the input signals it receives.

FIG. 5 shows the correspondence between signals inputted into the address decoding control unit 4 and the signals outputted by the address decoding control unit 4 for the various operations of the data transfer apparatus of the present embodiment.

In more detail, the data transfer apparatus of this first embodiment uses the combinations (0,0), (1,0) and (1,1) for the address signals (A1,A0). The data transfer apparatus of this second embodiment uses the combinations (0,0), (0,1) and (1,1) for the address signals (A1,A0) When a read is performed from the ISDN control unit 2, the address signals A1 and A0 inputted into the address decoding control unit 4 by the DMA control unit 8 are both zero, and the read signal R is set at "active".

On receiving these signals, the address decoding control unit 4 sets the ISDN control unit chip select signal CS_I at active.

When a read is performed from the FIFO memory 5, the address signals A1 and A0 are respectively set at zero and one, and the read signal R is set at active.

On receiving these signals, the address decoding control unit 4 sets the FIFO memory chip select signal CS_F and the FIFO memory read signal R_F at active.

When a read is performed from the FIFO memory 5 and the data is to be inputted into the infrared signal communication unit 6, the address signals A1 and A0 are respectively set at one and zero, and the write signal W is set at active.

On receiving these signals, the address decoding control unit 4 sets the FIFO memory chip select signal CS_F, the infrared signal communication unit chip select signal CS_O, and the FIFO memory read signal R_F at active.

When data is to be written into the FIFO memory 5 and written into the infrared signal communication unit 6, the address signals A1 and A0 are both set at one, and the write signal W is set at active.

On receiving these signals, the address decoding control unit 4 sets the FIFO memory chip select signal CS_F, the infrared signal communication unit chip select signal CS_O, and the FIFO memory write signal W_F at active.

The address decoding control unit 4 of the present data transfer apparatus performs the following procedure to output the appropriate signals as shown in FIG. 5.

Figure 6:
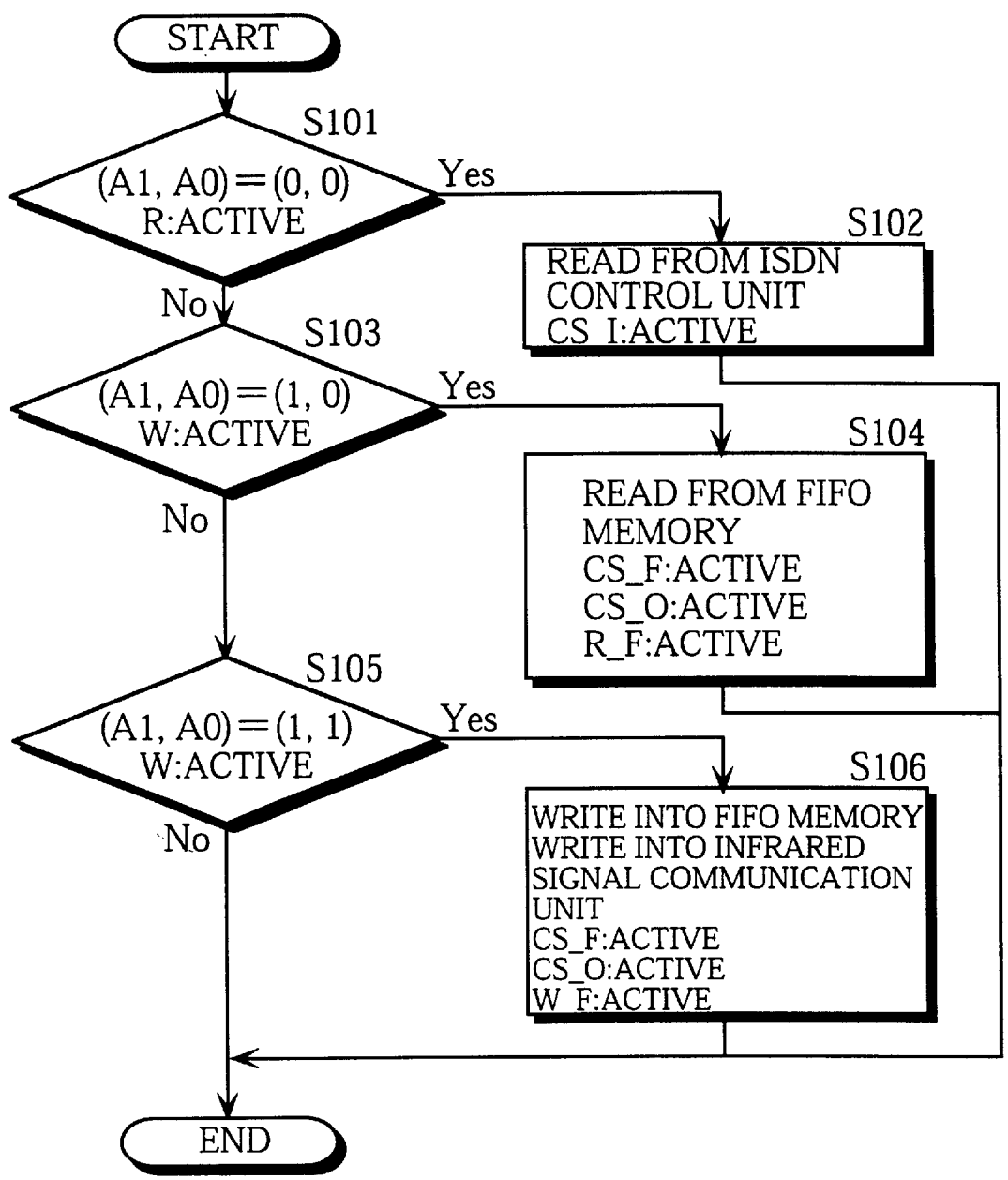
FIG. 6 is a flowchart showing the control procedure used by the address decoding control unit 4.
Figure 7:
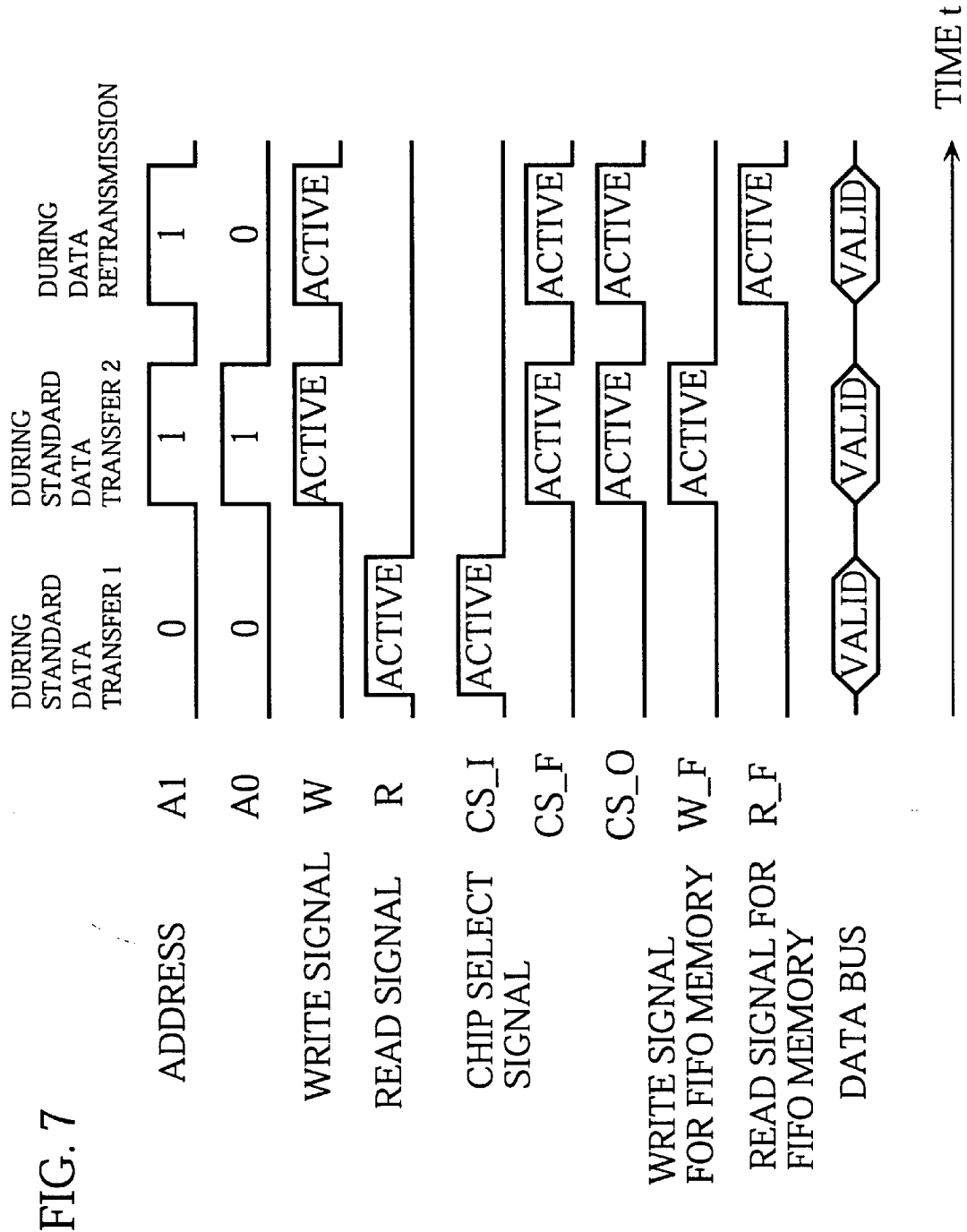
FIG. 7 shows the main signals used by the present data transfer apparatus during standard data transfer and during the retransmission of data.

FIG. 6 is a flowchart showing the control procedure used by the address decoding control unit 4. FIG. 7 shows the main signals used by the present data transfer apparatus during standard data transfer and during the retransmission of data.

During standard data transfer, ISDN data inputted via the input unit 1 (see FIG. 3) is analyzed and demultiplexed by the ISDN control unit 2 which converts the ISDN data into data that can be read by the DMA control unit 8.

In preparation for DMA transfer, the CPU 3 sets the source address of the ISDN control unit 2 and the destination addresses of the FIFO memory 5 and the infrared signal communication unit 6 in the DMA control unit 8. In order to have data read from the ISDN control unit 2 as instructed by the CPU 3, the DMA control unit 8 outputs the address signals (A1,A0)=(0,0) and a read signal R.

The address decoding control unit 4 receives the read signal R and the address signals (A1,A0)=(0,0), decodes the signals, and outputs an ISDN control unit chip select signal CS_I in accordance with the table shown in FIG. 5 (steps S101, S102 in FIG. 6).

This ISDN control unit chip select signal CS_I specifies the ISDN control unit 2, so that the data that has been demultiplexed is read from the ISDN control unit 2 by the DMA control unit 8.

At this point, the signals used within the present data transfer apparatus have the states shown by the "during standard data transfer 1" column in FIG. 7.

Next, the DMA control unit 8 outputs a write signal W and the address signals (A1,A0)=(1,1) in order to have data written into the FIFO memory 5 and the infrared signal communication unit 6.

The address decoding control unit 4 receives the write signal W and the address signals (A1,A0)=(1,1), decodes the signals, and outputs an FIFO memory chip select signal CS_F, a FIFO memory write signal W_F, and an infrared signal communication unit chip select signal CS_O in accordance with the table shown in FIG. 5 (steps S105, S106 in FIG. 6).

This FIFO memory chip select signal CS_F specifies the FIFO memory 5, so that the DMA control unit 8 has the data that has been read from the ISDN control unit 2 written into the FIFO memory 5, where the data is stored thereafter.

The infrared signal communication unit chip select signal CS_O that is outputted together with FIFO memory chip select signal CS_F specifies the infrared signal communication unit 6, so that the data that has been read from the ISDN control unit 2 is written into the infrared signal communication unit 6 at the same time as it is written into the FIFO memory 5. The infrared signal communication unit 6 converts this data to infrared data that is used by the output unit 11 to output an infrared signal.

At this point, the signals used within the present data transfer apparatus have the states shown by the "during standard data transfer 2" column in FIG. 7.

The procedure described above has the data temporarily stored in the FIFO memory 5 in case retransmission will be required. On receiving a predetermined retransmission request signal via the input unit 12 of the infrared signal communication unit 6, the CPU 3 of the present data transfer apparatus performs control so that the data in the FIFO memory 5 that needs to be retransmitted (hereafter, "retransmission data") is converted into an infrared signal and retransmitted.

In preparation for DMA transfer when transferring retransmission data, the CPU 3 sets the source address of the FIFO memory 5 and the destination address of the infrared signal communication unit 6 in the DMA control unit 8. In accordance with the instructions from the CPU 3, the DMA control unit 8 outputs the address signals (A1,A0)=(1,0) and a write signal W to the address decoding control unit 4 in order to have data read from the FIFO memory 5 and written into the infrared signal communication unit 6.

The address decoding control unit 4 receives the write signal and the address signals (A1,A0)=(1,0), decodes the signals, and outputs an FIFO memory chip select signal CS_F, a FIFO memory read signal R_F, and an infrared signal communication unit chip select signal CS_O in accordance with the table shown in FIG. 5 (steps S103, S104).

The FIFO memory chip select signal CS_F specifies the FIFO memory 5, so that the retransmission data stored in the FIFO memory 5 is read out by the DMA control unit 8.

The infrared signal communication unit chip select signal CS_O specifies the infrared signal communication unit 6, so that the retransmission data that has been read from the FIFO memory 5 is written into the infrared signal communication unit 6. The infrared signal communication unit 6 converts the retransmission data into infrared data that is used by the output unit 11 to output an infrared signal.

At this point, the signals used within the present data transfer apparatus have the states shown by the "during data retransmission" column in FIG. 7.

Using the above procedure, the data transfer apparatus of this first embodiment performs standard data transfer to have ISDN data that has been received by the input unit 1 and demultiplexed by the ISDN control unit 2 transferred by DMA to the FIFO memory 5 and the infrared signal communication unit 6. The data transfer apparatus also performs retransmission where demultiplexed data that has been stored in the FIFO memory 5 is transferred by DMA to the infrared signal communication unit 6.

The above method transfers data faster than conventional methods where data is transferred via the registers of a CPU. As data is transferred using DMA to the FIFO memory 5 and infrared signal communication unit 6 simultaneously, an infrared signal based on standard data or retransmission data can be outputted sooner than in a conventional method.

Second Embodiment

The following describes a data transfer apparatus that is a second embodiment of the present invention.

The data transfer apparatus of this second embodiment has the same construction as the data transfer apparatus of the first embodiment, and differs only in the operation of the address decoding control unit 4 during the transfer of retransmission data.

The following explanation only deals with the differences with the first embodiment, so that only the operation of the address decoding control unit 4 during the retransmission of data is described.

Figure 8:
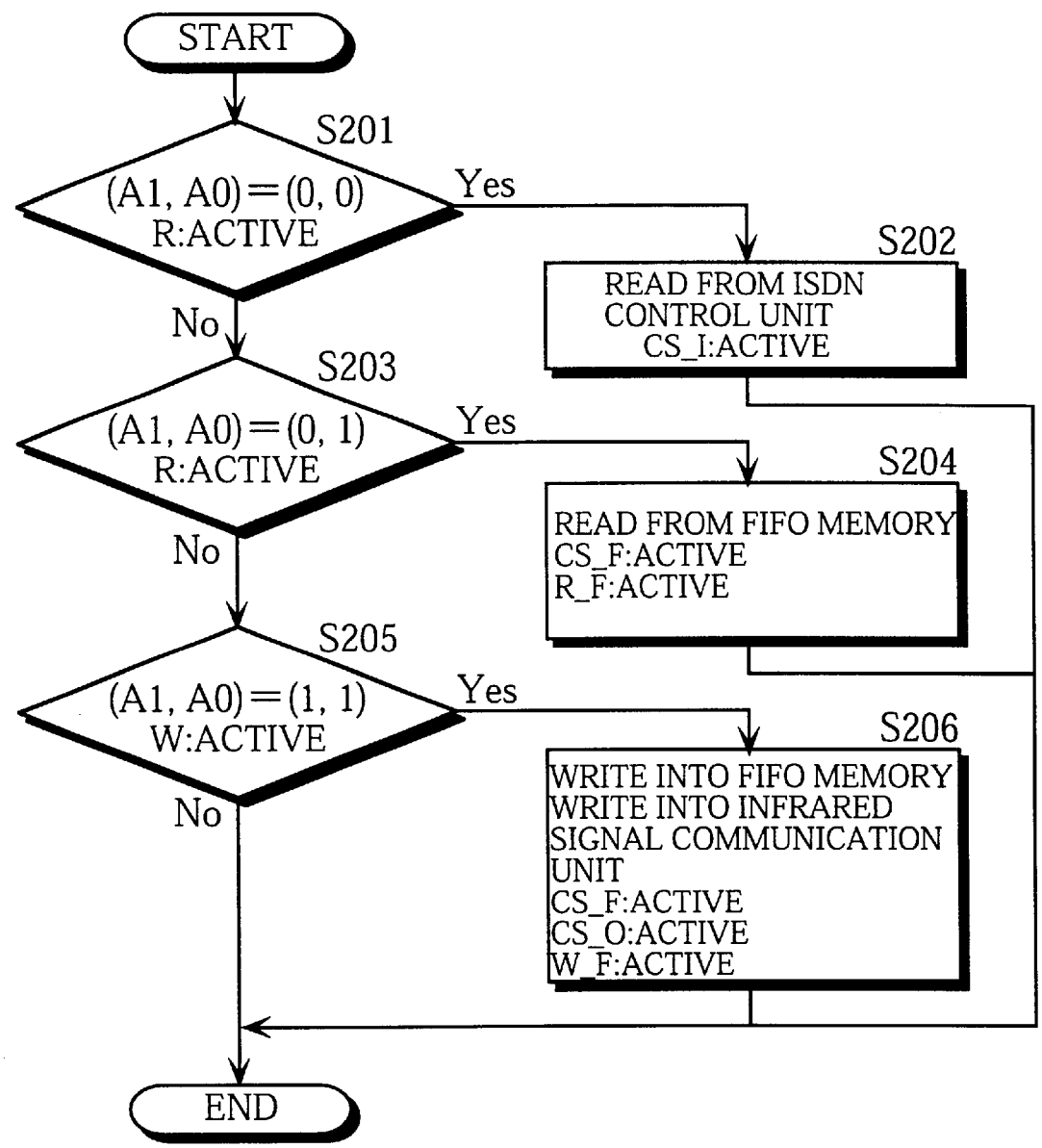
FIG. 8 is a flowchart showing the control procedure used by the address decoding control unit 4 in the data transfer apparatus of the second embodiment.
Figure 9:
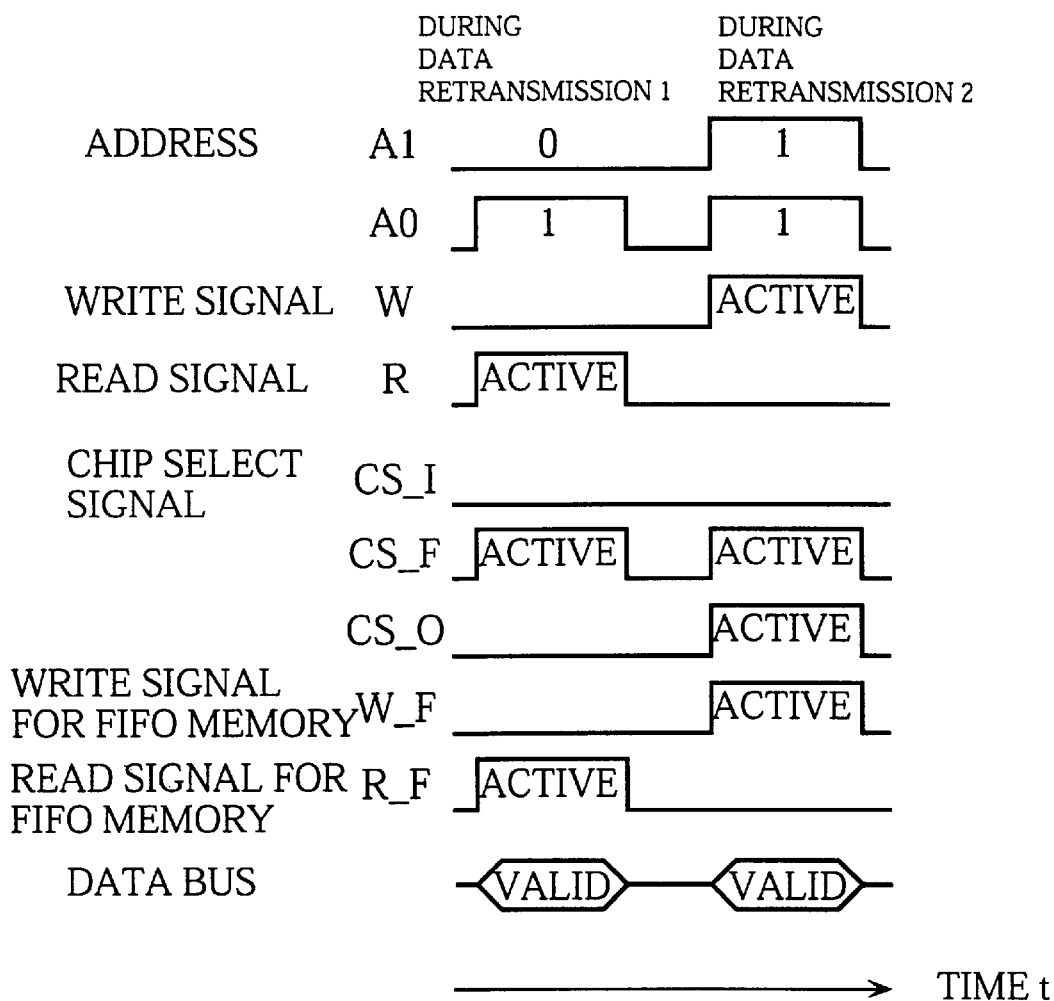
FIG. 9 shows the states of the main signals used by this data transfer apparatus during the retransmission of data.

FIG. 8 is a flowchart showing the operation of the address decoding control unit 4 in the data transfer apparatus of the second embodiment. FIG. 9 shows the states of the main signals used by this data transfer apparatus during the retransmission of data.

The control performed by the address decoding control unit 4 of the data transfer apparatus of the second embodiment in steps S203 to S206 of FIG. 8 corresponds to the control performed in steps S103 and S104 (of FIG. 6) by the address decoding control unit 4 of the data transfer apparatus of the first embodiment. The retransmission of data by the data transfer apparatus of the second embodiment shown as "during data retransmission 1" and "during data retransmission 2" in FIG. 9 corresponds to retransmission of data by the data transfer apparatus of the first embodiment shown as "during data retransmission" in FIG. 7.

By performing the operations in steps S201, S202, S205, and S206 in FIG. 8, the present data transfer apparatus executes the control required for standard data transfer. Like the data transfer apparatus of the first embodiment, on receiving a predetermined retransmission request signal, the CPU 3 starts the transfer of the retransmission data stored in the FIFO memory 5.

In preparation for DMA transfer when transferring retransmission data, the CPU 3 (see FIG. 3) sets the source address of the FIFO memory 5 and the destination address of the infrared signal communication unit 6 in the DMA control unit 8. As instructed by the CPU 3, the DMA control unit 8 outputs the address signals (A1,A0)=(0,1) and a read signal R in order to have data read from the FIFO memory 5.

The address decoding control unit 4 receives the write signal and the address signals (A1,A0)=(0,1), decodes the signals, and outputs an FIFO memory chip select signal CS_F and a FIFO memory read signal R_F in accordance with the table shown in FIG. 5 (steps S203 and S204 in FIG.

The FIFO memory chip select signal CS_F specifies the FIFO memory 5, so that the retransmission data stored in the FIFO memory 5 is read out by the DMA control unit 8.

At this point, the signals used within the present data transfer apparatus have the states shown by the "during data retransmission 1" column in FIG. 9.

Next, the DMA control unit 8 outputs a write signal W and the address signals (A1,A0)=(1,1) to have data written into the FIFO memory 5 and the infrared signal communication unit 6.

The address decoding control unit 4 receives the write signal W and the address signals (A1,A0)=(1,1), decodes the signals, and outputs an FIFO memory chip select signal CS_F, a FIFO memory write signal W_F, and an infrared signal communication unit chip select signal CS_O in accordance with the table shown in FIG. 5 (steps S205, S206 in FIG. 8).

The FIFO memory chip select signal CS_F specifies the FIFO memory 5, so that the retransmission data read from the FIFO memory 5 by the DMA control unit 8 is written back into the FIFO memory 5 for storage thereafter.

The infrared signal communication unit chip select signal CS_O outputted together with the FIFO memory chip select signal CS_F specifies the infrared signal communication unit 6, so that the retransmission data read from the FIFO memory 5 is written into the infrared signal communication unit 6 at the same time as it is written back into the FIFO memory 5. The infrared signal communication unit 6 converts the retransmission data to infrared data which the output unit 11 uses to generate the infrared signal it outputs.

At this point, the signals used within the present data transfer apparatus have the states shown by the "during data retransmission 2" column in FIG. 9.

Since the FIFO memory 5 is specified as both the transfer source and the transfer destination, the DMA transfer is executed in two bus cycles.

When the data transfer apparatus of this second embodiment performs standard data transfer, ISDN data inputted via the input unit 1 is demultiplexed by the ISDN control unit 2. The resulting data is then transferred using DMA to the FIFO memory 5 and the infrared signal communication unit 6. When transferring retransmission data, data that has already been demultiplexed is read from the FIFO memory 5 and DMA transfer is used to write the data into the infrared signal communication unit 6 and back into the FIFO memory 5.

The data transfer apparatus of the second embodiment is described hereafter using the specific example of an infrared signal transfer apparatus used by a videophone.

Figure 10:
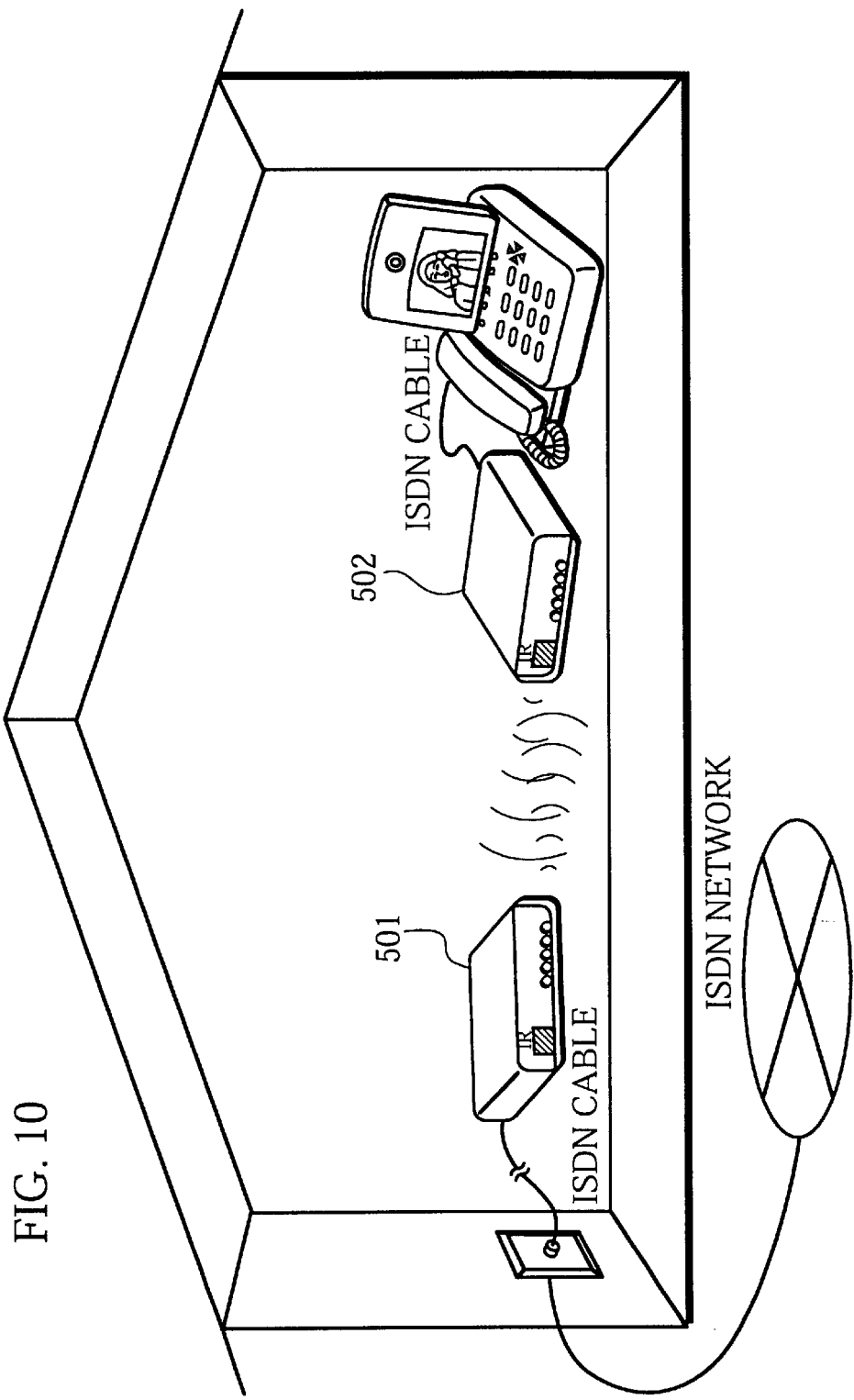
FIG. 10 shows the external appearance of two infrared signal transfer apparatuses 501 and 502.

FIG. 10 shows the external appearance of two infrared signal transfer apparatuses 501 and 502. These apparatuses 501 and 502 are respectively connected to an ISDN jack provided in the wall of a house, for instance, and a videophone.

The infrared signal transfer apparatuses 501 and 502 are converters that are used for forming a wireless infrared connection on part of an ISDN connection path.

These apparatuses allow the videophone used for communication on the ISDN connection to be positioned far from the ISDN jack. This means users can hold conversations using the videophone anywhere within the range of the infrared signals sent between the infrared signal transfer apparatuses 501 and 502.

The infrared signal transfer apparatuses 501 and 502 are equipped with the same functions.

In terms of functions, the infrared signal transfer apparatus 501 is the same as the data transfer apparatus shown in FIG. 3.

Figure 11:
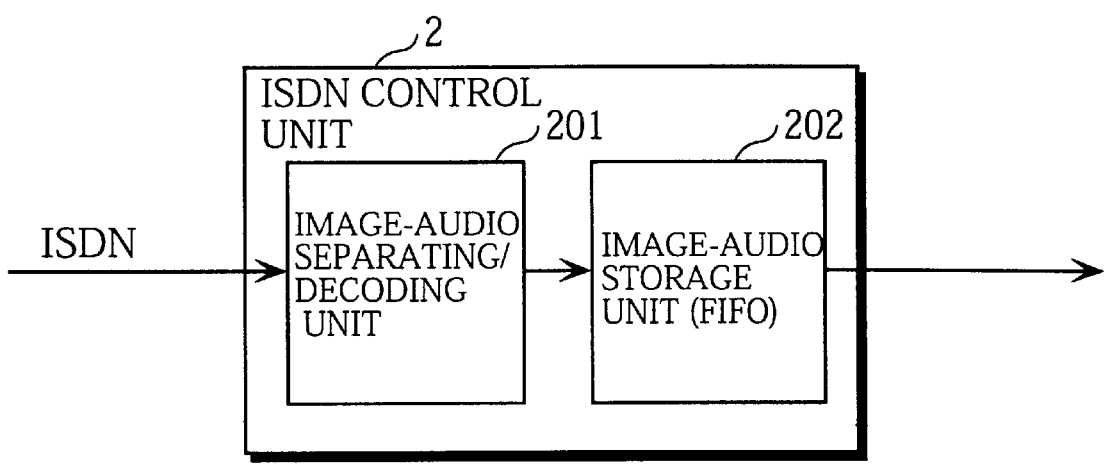
FIG. 11 is a functional block diagram showing the ISDN control unit 2 of FIG. 10.

As shown in FIG. 11, the ISDN control unit 2 includes an image-audio separating/decoding unit 201 and an image-audio storage unit (FIFO) 202.

In more detail, the image-audio separating/decoding unit 201 receives a 128 kbps signal into which an audio signal and an image signal have been multiplexed. The image-audio separating/decoding unit 201 separates and decodes the audio signal and the image signal, and outputs the resulting signals to the image-audio storage unit (FIFO) 202.

The image-audio storage unit (FIFO) 202 includes a FIFO memory that has a 256-byte storage region for audio signals and a 256-byte storage region for image signals.

The separated audio signal and image signal are temporarily stored in this FIFO memory.

Figure 12:
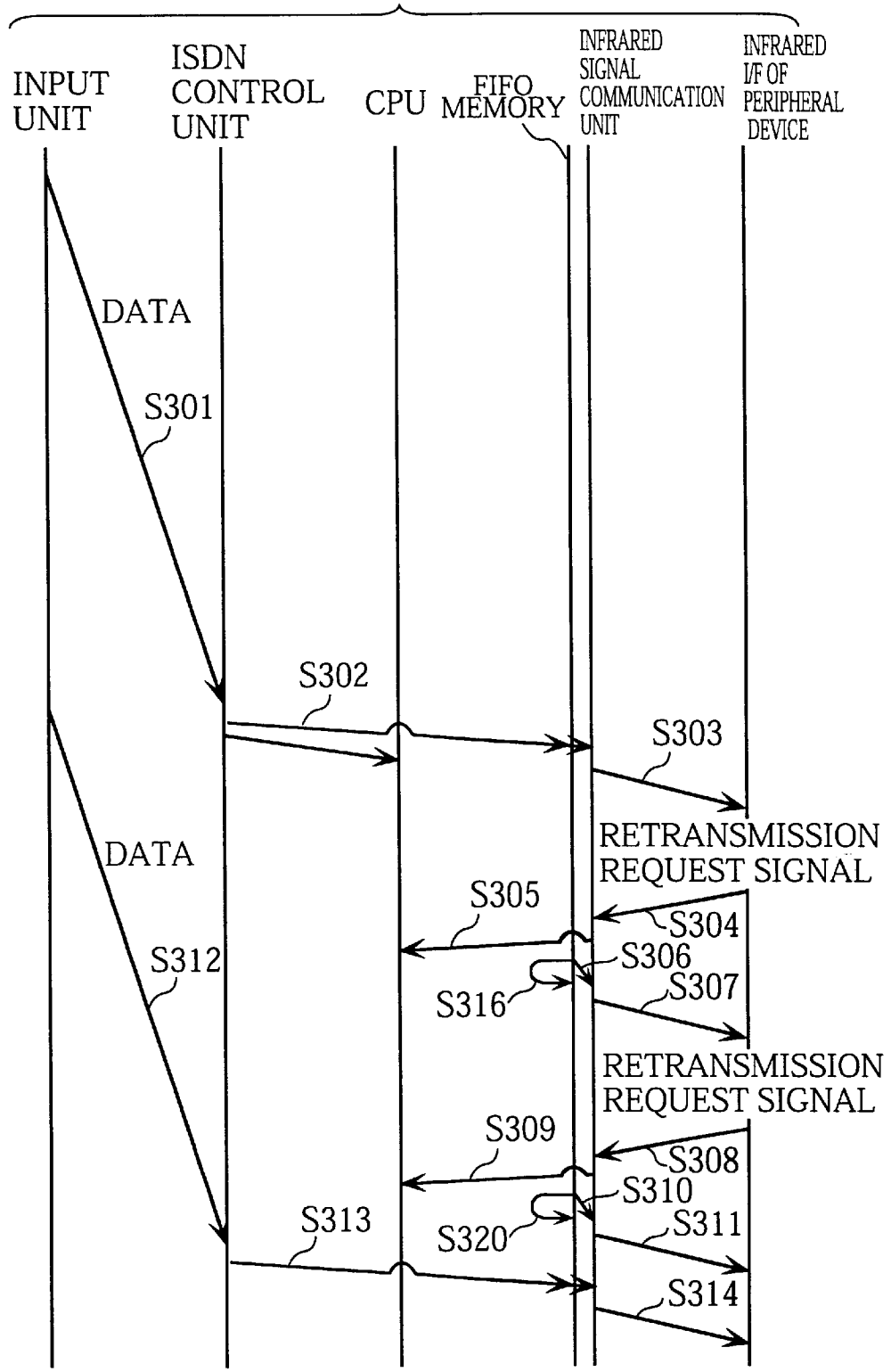
FIG. 12 shows the sequence of data inputs and outputs within the infrared signal transfer apparatus 501.

FIG. 12 shows the sequence used when data is inputted and outputted within the infrared signal transfer apparatus 501.

Note that the sequence shown in FIG. 12 also includes another the infrared signal interface, i.e., the infrared signal transfer apparatus 502, that receives infrared data and sends a retransmission request signal.

The user interface unit 2 receives 128 kbps ISDN data including an audio signal and an image signal (step S301, S312). The image-audio separating/decoding unit 201 analyzes this ISDN data and demultiplexes it to produce data that can be read by the DMA control unit 8. The image-audio separating/decoding unit 201 temporarily stores data in the image-audio storage unit 202 until 512 bytes of data have been accumulated.

When 512 bytes of data have been accumulated, the DMA control unit 8 writes a 512-byte block of data into the FIFO memory 5 where it is stored thereafter. The DMA control unit 8 simultaneously writes this data into the infrared signal communication unit 6 (steps S302, S313) The infrared signal communication unit 6 converts this data into infrared data, with the transmitting unit 11 outputting an infrared signal based on the infrared data (steps S303, S314). This infrared signal has a bit rate of 2 Mbps and is outputted for 2 msec.

The FIFO memory 5 has a 256-byte storage region for audio signals and a 256-byte storage region for image signals.

This output of data from the image-audio storage unit 202 to the FIFO memory 5 and the infrared signal communication unit 6 is repeated at regular intervals of 32 msec.

The time taken from the start to finish of the output from the image-audio storage unit 202 to the FIFO memory 5 and the infrared signal communication unit 6 is around 8 μsec.

Every time data is received from the transmitting unit 11, the infrared signal transfer apparatus 502 checks whether the data has been received correctly. The infrared signal transfer apparatus 502 also sends a response signal for the received data, so that a response signal is sent as part of a decision feedback system.

In more detail, the infrared signal transfer apparatus 502 sends an acknowledge (hereafter "ACK") signal when the data has been successfully received and an error (hereafter "NAK") signal when there is an error. These signals are sent as infrared data at a bit rate of 2 Mbps.

The infrared signal transfer apparatus 502 sends a response signal to the infrared signal transfer apparatus 501 whenever it has received a total of 512 bytes of audio signals and image signals.

On receiving a NAK signal from a peripheral device (i.e., the infrared signal transfer apparatus 502) (steps S304 and S308), the infrared signal communication unit 6 outputs a retransmission request signal to the CPU 3 (steps S305 and S309).

On receiving the retransmission request signal, the CPU 3 has the DMA control unit 8 rewrite the retransmission data stored in the FIFO memory 5 back into the FIFO memory 5 (steps S316, S320) and simultaneously into the infrared signal communication unit 6 (steps S306, S310).

The infrared signal communication unit 6 converts the data into 512 bytes of retransmission infrared data, based on which the transmitting unit 11 outputs an infrared signal at a bit rate of 2 Mbps (steps S307, S311) The above method transfers data faster than conventional methods where data is transferred via the registers of a CPU. As data is transferred using DMA to the FIFO memory 5 and infrared signal communication unit 6 simultaneously, an infrared signal based on standard data or retransmission data can be outputted sooner than in a conventional method.

When retransmission data is transferred in the data transfer apparatus of this second embodiment, the data read from the FIFO memory 5 is written back into the FIFO memory 5. This means that the retransmission of the same data can be repeated if another retransmission request signal is received.

In the above first and second embodiments, the data transfer apparatus that transmits the infrared signal is described as including a ISDN control unit 2 that analyzes and demultiplexes ISDN data and an infrared signal communication unit 6 that generates infrared data.

However, the present invention may also be embodied by a system where the transmitting data transfer apparatus uses a device which utilizes ADPCM (Adaptive Differential Pulse Code Modulation) or the like and the receiving data transfer apparatus may use a device such as a UART (Universal Asynchronous Receiver Transmitter) or the like.

In the data transfer apparatuses of the first and second embodiments, the CPU 3 is described as setting addresses in the DMA control unit 8 so that DMA transfer can be performed. In addition, the CPU 3 may perform other processes, such as judging whether the response received from a peripheral device such as the infrared signal transfer apparatus 502 is "ACK" or "NAK", or judging that data has been unsuccessfully transferred when no response signal is received within a predetermined period.

When data is retransmitted by the data transfer apparatus of the second embodiment, the retransmission data stored in the FIFO memory 5 is read from the FIFO memory 5 by the DMA control unit 8 and written into the FIFO memory 5 and infrared signal communication unit 6 simultaneously. This DMA transfer is described above as being executed in two bus cycles since the FIFO memory 5 is specified as both the transfer source and the transfer destination. However, in the internal construction of the FIFO memory 5, a bypass may be formed between the output terminals and the input terminals. When this construction is used, whenever data is read from the FIFO memory 5, the DMA control unit 8 may output a FIFO memory chip select signal CS_F, a read signal and a write signal in a way that has the read data written back into the FIFO memory 5 having flowed through the bypass, not through data transfer via the DMA control unit 8.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A data transfer apparatus that receives data, which should be transferred in real time, from a first external device and outputs the data to a second external device, the second external device receiving the data outputted by the data transfer apparatus and outputting a retransmission request signal for the data to the data transfer apparatus when the data is not received properly, the data transfer apparatus comprising:

receiving means for receiving data from the first external device;

storage means for storing the data received by the receiving means;

output means for receiving data and outputting the data to the second external device;

retransmission request receiving means for receiving a retransmission request signal from the second external device; and transfer control means for having a first transfer performed when the receiving means has received data from the first external device and a second transfer performed when the retransmission request receiving means has received the retransmission request signal, the first transfer transferring the data directly to both the output means and the storage means in parallel using direct memory access (DMA), and the second transfer transferring data, which has already been stored in the storage means by the first transfer, to the output means.

2. A data transfer apparatus in accordance with claim 1, wherein the second transfer transfers the data stored in the storage means to the output means using DMA.

3. A data transfer apparatus in accordance with claim 1, wherein the storage means is a FIFO (first-in, first-out) memory that temporarily stores data received from the receiving means, and the second transfer also transfers the data outputted by the FIFO memory back into the FIFO memory using DMA.

4. A data transfer apparatus in accordance with claim 3, wherein the transfer control means has the first transfer performed intermittently with a predetermined interval, and the second transfer performed only when the retransmission request signal is received in a reception period that starts at the end of a first transfer and ends at a time given as the start of a next first transfer minus a period taken between (1) reception of the retransmission request signal and (2) an end of the second transfer.

5. A data transfer apparatus in accordance with claim 4, wherein the transfer control means has the first transfer and the second transfer transfer an amount of data that is equal to an input amount, the input amount being an amount of data received from the first external device in the predetermined interval, and the receiving means includes a FIFO memory for temporarily storing data that is received in order from the first external device, the FIFO memory having a storage capacity that is at least equal to the input amount.

6. A data transfer apparatus in accordance with claim 5, wherein the retransmission request signal is an infrared signal, the retransmission request receiving means includes an infrared signal sensor including an infrared signal receiver, and the output means is an infrared signal emitter that converts the received data into an infrared signal and outputs the infrared signal.

7. A data transfer apparatus in accordance with claim 5, wherein the first external device and the receiving means are connected via ISDN (Integrated Services Digital Network) lines, the data received from the first external device is multiplexed into a signal, and the receiving means demultiplexes the data from the signal.

8. A data transfer apparatus in accordance with claim 1, wherein the transfer control means has the first transfer performed intermittently with a predetermined interval, and the second transfer performed only when the retransmission request signal is received in a reception period that starts at the end of a first transfer and ends at a time given as the start of a next first transfer minus a period taken between (1) reception of the retransmission request signal and (2) an end of the second transfer.

9. A data transfer apparatus in accordance with claim 8, wherein the transfer control means has the first transfer and the second transfer transfer an amount of data that is equal to an input amount, the input amount being an amount of data received from the first external device in the predetermined interval, and the receiving means includes a FIFO memory for temporarily storing data that is received in order from the first external device, the FIFO memory having a storage capacity that is at least equal to the input amount.

10. A data transfer apparatus in accordance with claim 9, wherein the retransmission request signal is an infrared signal, the retransmission request receiving means includes an infrared signal sensor including an infrared signal receiver, and the output means is an infrared signal emitter that converts the received data into an infrared signal and outputs the infrared signal.

11. A data transfer apparatus in accordance with claim 10, wherein the first external device and the receiving means are connected via ISDN (Integrated Services Digital Network) lines, the data received from the first external device is multiplexed into a signal, and the receiving means demultiplexes the data from the signal.

12. A data transfer system comprising a first apparatus and a second apparatus, the first apparatus receiving data that needs to be transferred in real time from an external device and outputting the data to the second apparatus, the first apparatus including:

first receiving means for receiving data from the external device;

storage means for storing data received by the first receiving means;

output means for receiving data and outputting the data to the second apparatus;

retransmission request receiving means for receiving the retransmission request signal from the second apparatus; and transfer control means for having a first transfer performed when the first receiving means has received data from the external device and a second transfer performed when the retransmission request receiving means has received the retransmission request signal, the first transfer transferring the data directly to both the output means and the storage means in parallel using direct memory access (DMA), and the second transfer transferring data, which has already been stored in the storage means by the first transfer, to the output means, the second apparatus including:
- second receiving means for receiving data outputted by the first apparatus; and
- retransmission request issuing means for judging, when the second receiving means has received data, whether the data has been properly received and outputting a retransmission request signal to the first apparatus when the data has not been properly received.

13. A data transfer system in accordance with claim 12, wherein the second transfer transfers data from the storage means to the output means using DMA.

14. A data transfer system in accordance with claim 13, wherein the storage means is a FIFO memory that temporarily stores data received from the first receiving means, and
the second transfer also transfers the data outputted by the FIFO memory back into the FIFO memory using DMA.

15. A data transfer system in accordance with claim 14, wherein the transfer control means has the first transfer performed intermittently with a predetermined interval, and the second transfer performed only when the retransmission request signal is received in a reception period that starts at the end of a first transfer and ends at a time given as the start of a next first transfer minus a period taken between (1) reception of the retransmission request signal and (2) an end of the second transfer.

16. A data transfer system in accordance with claim 15, wherein the transfer control means has the first transfer and the second transfer transfer an amount of data that is equal to an input amount, the input amount being an amount of data received from the first external device in the predetermined interval, and
the first receiving means includes a FIFO memory for temporarily storing data that is received in order from the external device, the FIFO memory having a storage capacity that is at least equal to the input amount.

17. A data transfer apparatus in accordance with claim 16, wherein the retransmission request signal is an infrared signal,
the retransmission request receiving means includes an infrared signal sensor including an infrared signal receiver, and
the output means is an infrared signal emitter that converts the received data into an infrared signal and outputs the infrared signal.

18. A data transfer method that has a data transfer apparatus receive data, which should be transferred in real time, from a first external device and output the data to a second external device, the second external device receiving the outputted data and outputting a retransmission request signal for the data to the data transfer apparatus when the data is not received properly, the data transfer apparatus including storage means for storing data and output means for outputting data to the second external device, and the data transfer method comprising:
- a receiving step for receiving data from the first external device;
- a retransmission request receiving step for receiving the retransmission request signal from the second external device;
- a transfer control step for having a first transfer performed when the receiving step has received data from the first external device and a second transfer performed when the retransmission request receiving step has received the retransmission request signal, the first transfer transferring the data directly to both the output means and the storage means in parallel using direct memory access (DMA), and
- the second transfer transferring data, which has already been stored in the storage means by the first transfer, to the output means; and an output step for having the output means output the transferred data to the second external device.

19. A data transfer method in accordance with claim 18, wherein the second transfer transfers the data stored in the storage means to the output means using DMA.

20. A data transfer method in accordance with claim 19, wherein the storage means is a FIFO memory that temporarily stores data received from the first external device, and
the second transfer also transfers the data outputted by the FIFO memory back into the FIFO memory using DMA.

* * * * *